UNITED STATES PATENT OFFICE.

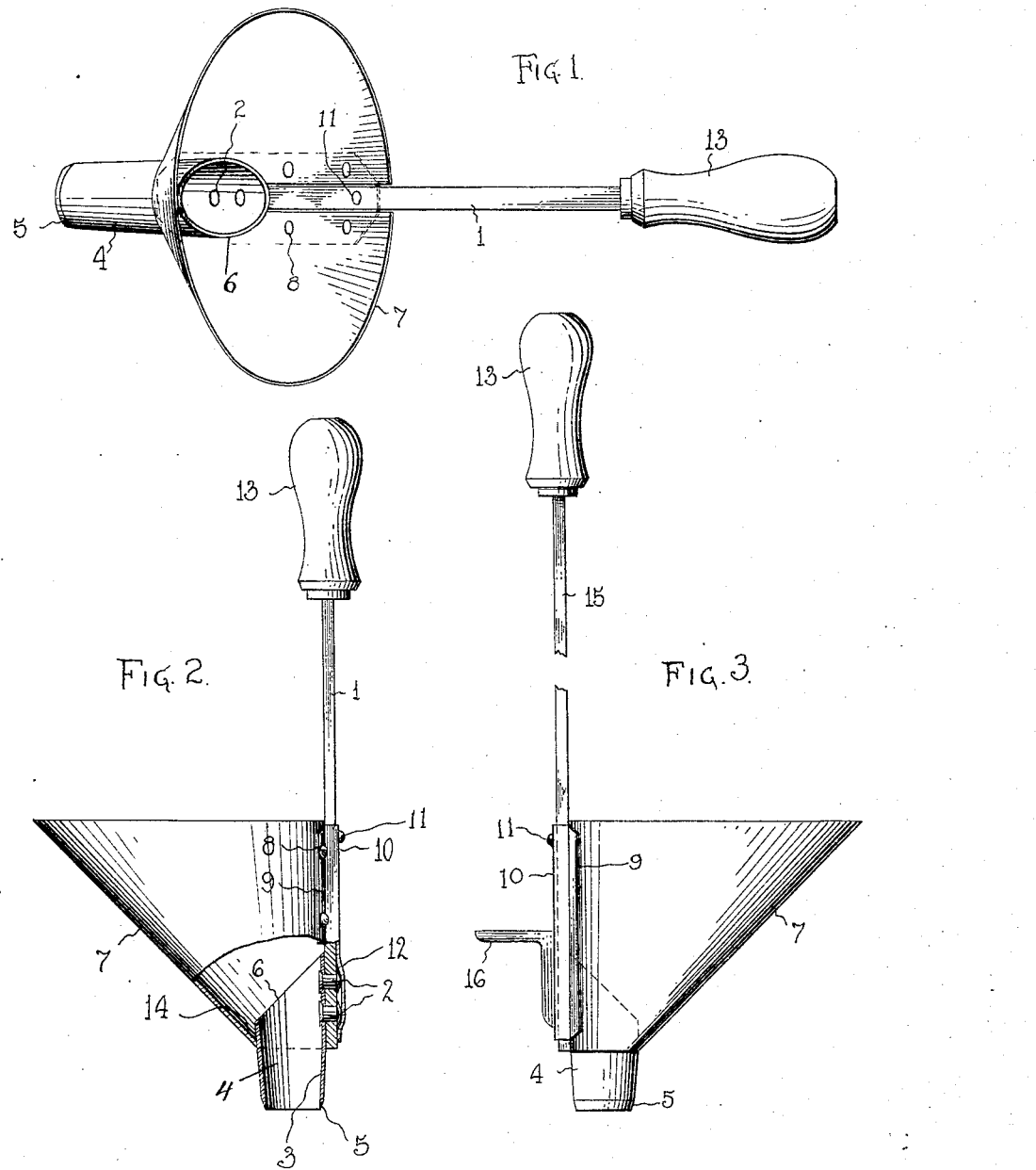

MARK A. SHELDON, OF DETROIT, MICHIGAN.

WEEDER.

1,183,127.  Specification of Letters Patent.  Patented May 16, 1916.

Application filed July 28, 1915. Serial No. 42,247.

*To all whom it may concern:*

Be it known that I, MARK A. SHELDON, a citizen of the United States of America, residing at Detroit, in the county of Wayne and State of Michigan, have invented certain new and useful Improvements in Weeders, of which the following is a specification, reference being had therein to the accompanying drawings.

This invention relates to a weeding device, and the primary object of my invention is to provide a simple and inexpensive device by which weeds and the roots thereof can be expeditiously removed, the device being especially adapted for removing dandelions and other weeds from a lawn.

A further object of my invention is to provide a strong and durable weeder embodying a funnel shaped receptacle in which roots, stems and other matter collect and are temporarily held during the use of the implement.

The mechanical construction by which I attain the above and other objects will be hereinafter described and then claimed, and reference will now be had to the drawing, wherein—

Figure 1 is a plan of the weeding device, Fig. 2 is a side elevation of the same, partly broken away and partly in section, and Fig. 3 is a similar view illustrating a slight modification of my invention.

A preferred form of the weeding device includes a short handle bar 1 and riveted or otherwise connected to the lower end of said bar, as at 2, is the long wall 3 of a tapering extracting tube 4, said tube having the lower edges thereof beveled to provide an annular cutting edge 5, and the upper end of the tube cut at an angle, as at 6 to provide a large exit opening for the tube. Surrounding the extracting tube 4, approximately intermediate the ends thereof, are the lower edges of a funnel shaped receptacle 7, made of a pliable sheet of metal cut and bent to desired form. The vertical edges of the formed sheet of metal are riveted or otherwise connected, as at 8 to the lateral flanges 9 of a channel member 10. This channel member embraces the lower end of the handle bar 1 and is riveted or otherwise connected to said handle bar, as at 11. Contiguous to the lower end of the handle bar the channel member 10 is off-set, as at 12 to provide clearance for the heads of the rivets 2, and at the upper end of the handle bar 1 is a suitable handle 13.

The inner end of the extracting tube 4 coöperates with the walls of the receptacle 7 in providing a gutter 14, and as roots or stems are forced into the receptacle, the gutter receives the roots or stems and prevents their accidental displacement or passage through the extracting tube 4 as the weeder is carried from one weed to another.

To remove a weed it is only necessary to force the extracting tube downwardly over the weed into the ground and then by tilting the device, the root or stem is broken or cut by the annular cutting edge 5 of the extracting tube and as the greater part of the weed extends into the receptacle 7, the device can be removed from the ground. When placed over another weed, the weed extending into the extracting tube is forced into the receptacle 7 and from time to time said receptacle can be emptied.

With extracting tube 4 disposed substantially in alinement with the handle bar 1, considerable pressure can be brought to bear upon the handle bar to force the extracting tube 4 into indurate earth, and with the extracting tube opening into the receptacle 7 weeds can be easily collected therein.

In Fig. 3 of the drawing, there is illustrated a slight modification of my invention, wherein the device has a handle bar 15 of greater length than the handle bar 1 and adjacent the lower end of the handle bar 15 is an angle bracket 16 constituting a foot piece upon which a foot may be placed to force the extracting tube of the device into the ground.

In either instance, the tapering extracting tube can be easily forced into the ground by reason of its annular cutting edge 5 and the plant and earth which enters the extracting tube and the receptacle 7 can be readily removed by simply inverting the weeding device. Furthermore, the tapering extracting tube leaves a hole in the ground, at such roots as remain therein, consequently the hole can be filled with oil or a liquid which would kill the root and prevent further growth.

The shape of the receptacle 7 is such as to serve as a deflector or guard when weeding a garden, insomuch that when placing the extracting tube in position over a weed the receptacle deflects other plants away from the weed whereby such plant will not be accidentally cut, broken or injured.

While in the drawings, there are illustrated the preferred embodiments of my invention, it is to be understood that the structural elements are susceptible to such variations and modifications as fall within the scope of the appended claim.

What I claim is:

A weeding device comprising a handle bar, a tapering extracting tube connected to the lower end thereof and having the outer end thereof provided with an annular cutting edge and the inner end cut at an angle to provide a large exit opening, fastening means connecting the long wall of said extending tube to the lower end of said handle bar, a funnel shaped receptacle in communication with the exit opening of said extracting tube and having straight edges terminating at opposite sides of said handle bar, a channel member embracing said handle bar over said fastening means and connected to the straight edges of said receptacle, fastening means connecting the upper ends of said channel member to said handle bar.

In testimony whereof I affix my signature in presence of two witnesses.

MARK A. SHELDON.

Witnesses:
ANNA M. DORR,
G. E. McGRANN.